United States Patent
Jalil et al.

(10) Patent No.: US 7,477,914 B2
(45) Date of Patent: Jan. 13, 2009

(54) REAL-TIME SPECTRUM MANAGEMENT TO INCREASE FREQUENCY REUSE

(76) Inventors: Rehan Jalil, 2678 Sycamore Grove Pl., San Jose, CA (US) 95121; Mustafa Ergen, 440 Spruce St., Berkeley, CA (US) 94708

( * ) Notice: Subject to any disclaimer, the term of this patent is extended or adjusted under 35 U.S.C. 154(b) by 580 days.

(21) Appl. No.: 11/317,104

(22) Filed: Dec. 22, 2005

(65) Prior Publication Data
US 2007/0147287 A1 Jun. 28, 2007

(51) Int. Cl.
*H04B 7/00* (2006.01)
(52) U.S. Cl. .............. 455/524; 455/456.1; 455/456.2; 455/422.1
(58) Field of Classification Search ............ 455/524, 455/456.1, 456.2, 453, 452.1, 425.2, 62, 455/451, 450, 422; 370/329, 349, 341, 342, 370/338, 340; 709/217; 375/227; 343/766
See application file for complete search history.

(56) References Cited
U.S. PATENT DOCUMENTS

| | | | |
|---|---|---|---|
| 3,713,164 A * | 1/1973 | Foury | 343/766 |
| 7,180,877 B1 * | 2/2007 | Benveniste | 370/329 |
| 2001/0055297 A1 * | 12/2001 | Benveniste | 370/349 |
| 2005/0254555 A1 | 11/2005 | Teague | |
| 2006/0285585 A1 * | 12/2006 | Sampath | 375/227 |

* cited by examiner

Primary Examiner—Tan Trinh (57) ABSTRACT

A wireless network allocates special base-station resources to mobile user devices in the inter-station overlapping fringes that are also serviceable by a neighboring base-station. Included-fringe mobile user devices interoperate with a base-station that has been assigned to handle those particular mobile user devices. If a central controller has assigned another base-station to service them, they are referred to as an excluded-fringe mobile user device. Mobile user devices that are not visible to other base-stations can access the general base-station resources, but not any of the special base-station resources reserved for overlapping fringe area use. If no mobile user devices are operating in the overlapping fringe areas, then all the special base-station resources can be returned to the main pool of general base-station resources. A global scheduler, one part of split-level scheduling, in the central controller determines the amount of special and general base-station resources. A local scheduler, another part of split-level scheduling, in the base station do fair-sharing of its resources among user devices within their allocated type of resources. Base station can use special base-station resource of others with electronically steering antennas together with network wide awareness of central controller to optimize the spectrum usage.

9 Claims, 3 Drawing Sheets

REAL-TIME SPECTRUM MANAGEMENT TO INCREASE FREQUENCY REUSE

BACKGROUND OF THE INVENTION

1. Field of the Invention

The present invention relates to cellular wireless networks, and in particular to orthogonal frequency division multiplexing access (OFDMA) equipment and methods to reduce interference caused by competing adjacent base-station transmitters. Currently, such OFDMA equipment includes IEEE-802.16 WiMax, IEEE-802.20 OFDMA, and the next generation of 3G systems.

2. Description of the Prior Art

The nature of radio communication is there will always be some sort of interference. Serious interference will be disruptive and can make communication impossible. Its sources can either be other communication or merely the unintentional spurious radiations of nearby electronic devices. Less serious interference can cause data errors and inject noise into video and audio channels.

Channel and bandpass filters can be very effective at both the source of the interference and the receiver to control the adverse effects. But if the interference is on the same channel frequency, and is relatively close, then it becomes impossible to avoid it.

Cellular type communications systems place many similar base-stations with their radio transmitters side-by-side in the cellular matrix in a region. A single base-station can be completely surrounded at the fringes of its service area by several other base-stations in the same service. Such allows one base-station to handover its support to another as mobiles roam through the agglomeration of service cells.

At some point between every two or three such base-station radio transmitters, a mobile roaming in the region will receive all equally. It becomes problematic at that point which one to listen to, and how to ignore or filter-out the base-stations of no interest.

In real commercial applications, there are too many users and too few channels not to make every frequency, time, or code division multiple access slot available in every cell. Schemes that dispose of slots to end interference must do so very judiciously, and then only as long as circumstances justify the waste. Otherwise, "dial-tone" and other indications of service availability will be scarce and the client users will be annoyed or alienated.

Edward Teague describes "Interference Control Via Selective Blanking/Attenuation of Interfering Transmission" in United States Patent Application US 2005/025455 A1, published Nov. 17, 2005. Neighboring sectors use a target user's frequency hopping sequence to form a blanking pattern. Subbands that overlap on a particular roaming-user are either blanked or power is reduced to quell the interference that would otherwise occur. The receivers then see either punctured or lower energy symbols for these subbands. The blanking and power reductions are transparent to the target and neighboring users, and so do not need to do anything special with the involved subbands.

Such does not use a backbone or central controller 108 to coordinate and track all the blanked or de-powered subbands in all the base-stations and users in a region. Also, it suggests blanking co-ordination between base stations at a subscriber station level. The unavoidable latencies in recognizing the data traffic patterns of subscriber stations, scheduling of bandwidth for subscriber stations by interfering base stations and the latencies involved in communicating between all the interfering base stations, makes the scheme impractical or less efficient. Communications latencies prohibit dealing with individual terminal devices on a case-by-case basis. Service is typically demanded more quickly than the control decisions can be made.

Code division multiple access (CDMA) modulation is the principle reason cellular transmissions don't collide with one another when two different transmitters broadcast at the same time and on the same frequency. But the new OFDMA technology making a start this year and next, uses modulation techniques that require relatively clear channels.

So-called WiMax actually involves two different IEEE Standards. A key difference between IEEE-802.16-2004 and IEEE- 802.16e profiles is their multiplexing techniques. IEEE-802.16-2004 uses OFDM, and IEEE-802.16e uses OFDMA. OFDM works by splitting the radio signal into multiple smaller sub-signals that are then transmitted simultaneously at different frequencies to the receiver. It can reduce the amount of crosstalk in signal transmissions.

For broadband wireless access, most of the activity takes place in the Media Access Control (MAC) layer and the Physical (PHY) layer. Broadband wireless air (PHY) interfaces include single carrier, Orthogonal Frequency Division Multiplexing (OFDM), and Orthogonal Frequency Division Multiple Access (OFDMA). Others are Wideband Code Division Multiple Access (WCDMA), Universal Mobile Telecommunications System (UMTS), cellular 3G, and the many variations of OFDMA being considered for 4G and future indoor wireless networks.

Wi-Fi generally refers to the 802.11a/b/g/n family of indoor wireless networks. Many vendors built proprietary MAC and PHY systems that extended these capabilities to outdoor networks. Some of these systems used a single carrier. Several leveraged OFDM capabilities. Others chose WCDMA or UMTS approaches. But the idea was to create effective outdoor networks.

The IEEE-802.16 defines a metropolitan area network (MAN) standard for broadband wireless or WiMAX, e.g., fixed broadband wireless (802.16-2004), and mobile broadband wireless (802.16e). Both support multiple PHY modes, neither of which include WCDMA or UMTS.

| 802.16-2004 (fixed) | 802.16e (mobile) |
| --- | --- |
| Single Carrier | Single Carrier |
| OFDM 256 FFT | OFDM 256 FFT |
| OFDMA 2048 FFT | OFDM 2048 FFT |
|  | sOFDMA 1024 FFT |
|  | SOFDMA 512 FFT |
|  | sOFDMA 128 FFT |

The WiMAX Forum chose the OFDM 256 FFT mode for the fixed WiMAX product. Product profiles for mobile WiMAX have yet to be chosen as the standard is not yet ratified. Some version of OFDMA is expected to be incorporated. The Qualcomm Flarion uses a variation called Flash OFDM.

WiMax transmissions use a combination of frequency (FDMA) and time division (TDMA) techniques to increase the number of mobiles that can be supported while roaming in each service area. The scarcity and licensing expense of the radio spectrum used for WiMax service means neighboring cells will be using the same frequencies.

So what is needed is a cellular wireless network that can make optimal use of scarce and expensive broadband wireless air resources with ever-changing populations of remote, subscriber terminal, and roaming mobile user devices.

SUMMARY OF THE INVENTION

Briefly, a wireless network system connects together a number of neighboring base-stations to a central controller. Remote, subscriber terminal, and roaming mobile user devices in the wireless service areas of the base-stations report the signal strength each observes from respective base-stations. Near equal signal strengths reported by a mobile indicate it is some fringe area overlapped by at least two base-station service areas. The signal strengths, and the identities of the mobile and the involved base-stations are reported through to the central controller. There, decisions are made as to which base-stations should back off or back down by vacating various frequency/time division slots. The central controller has a global point-of-view, and makes top-level decisions that result in the best use of network resources system wide. Resources are allocated so the heaviest traffic demands can nevertheless be serviced.

An advantage of the present invention is that a wireless network is provided that uses a single channel across the network to eliminate co-channel interference in a fringe-area mobile user device from two neighboring base-stations.

A further advantage of the present invention is that a wireless network is provided that uses a single channel across a network and eliminates adjacent channel interference and co-channel interference in a fringe-area terminal device by competing base-stations.

Another advantage of the present invention is that a wireless network is provided with a central controller to optimize traffic capacity system-wide.

A further advantage of the present invention is that a wireless network is provided that can adapt its available resources to changing population and traffic demands of roaming mobile user devices.

A still further advantage of the present invention is that a wireless network is provided that can adapt its available resources to changing populations of roaming terminal devices as well as changing traffic demand of fixed/mobile terminals.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
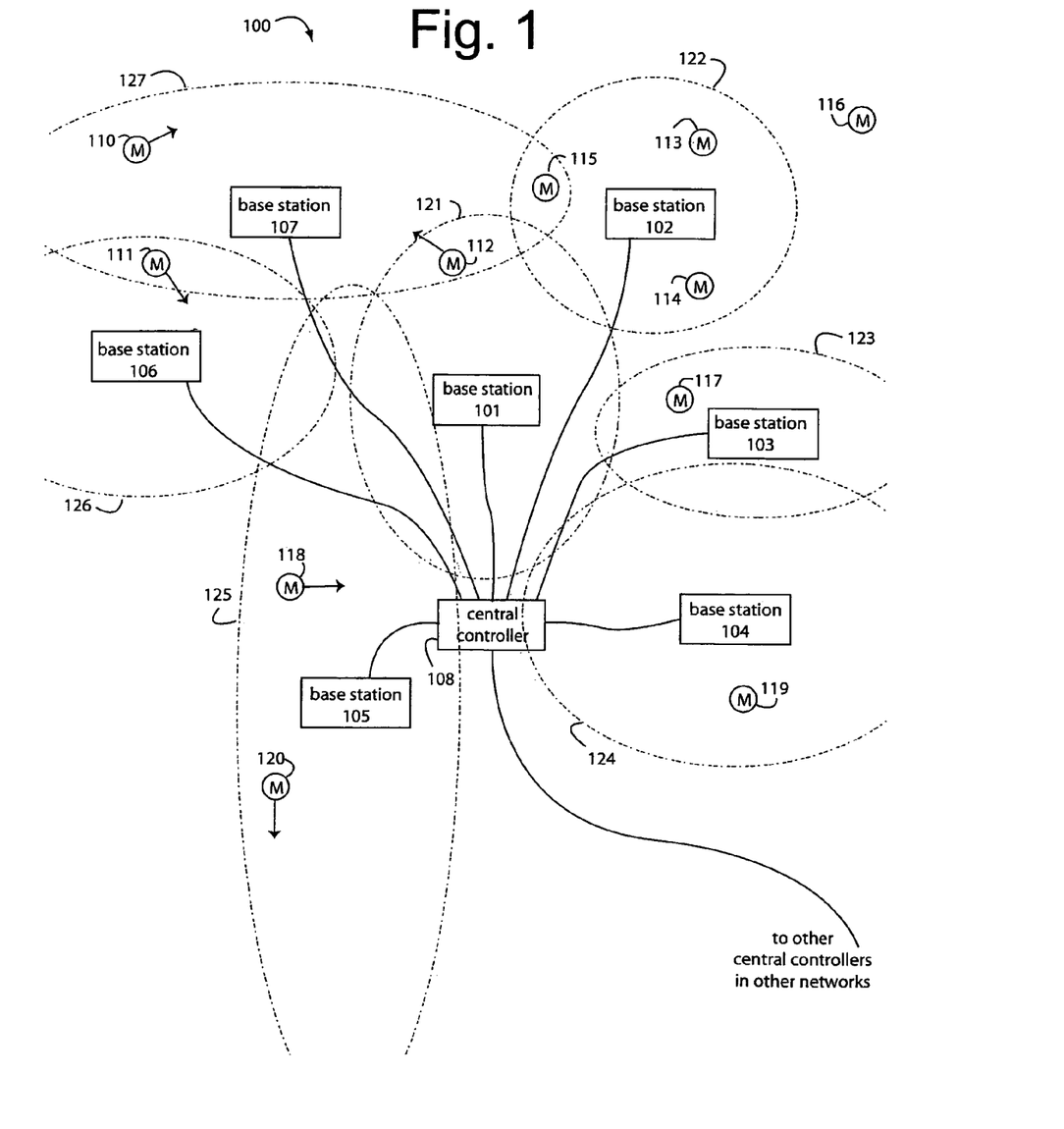
FIG. 1 is a plan-view diagram of a cellular wireless network system embodiment of the present invention showing the various base-station service areas and their overlaps, together with a few remote, subscriber terminal, and roaming mobile user devices.

FIG. 1 represents a wireless network system embodiment of the present invention, and is referred to herein by the general reference numeral 100. The wireless network system 100 connects together a number of neighboring base-stations 101-107 to a central controller 108. Remote, subscriber terminal, mobile, and other types of user devices ("mobile user device") 110-120 can be placed in, or move about into and out of, the wireless service areas 121-127 of the base-stations 101-107. Each mobile user device 110-120 periodically reports to the central controller 108 the signal strength it observes for the respective base-stations. The reports are communicated by any base-station 101-107 able to transfer such data. In the case of mobile user device 116, such report is not possible because it's outside service areas 121-127.

FIG. 1 plots a two-dimensional space. The mobile user devices are shown with vectors representing their relative roaming directions and speeds. The base-stations have fixed locations, but none of them necessarily have the ability to sense the direction or distance to any other network member. Typically, mobile user devices and base-stations have only a one-dimensional sense, e.g., the signal strength of transmissions by nearby units. When the transmissions of two or more base-stations conflict at a mobile user device's receiver, then action is needed to make sure that terminals start using different resources within the same channel to avoid interference.

Mobile user devices 110, 113, 114, and 117-120 are operating without conflict between base-stations because they are fully within a single service area. But when a mobile user device like 111, 112, or 115 is at a position overlapped by two service areas, then the central controller 108 has to resolve the conflict by sending instructions to the affected base-stations. In the case of mobile user devices 111, 112, and 115, the affected base-station will be 101, 102, 106, and 107. These overlaps involve only two service areas each. But it can be seen from FIG. 1 that it is possible for three service areas to overlap simultaneously in one spot. Table I summarizes the situation illustrated in FIG. 1.

TABLE I

| mobile | base-station/service-area |
| --- | --- |
| 110 | 107/127 only |
| 111 | 106/126 |
|  | 107/127 |
| 112 | 101/121 |
|  | 107/127 |
| 113 | 102/122 only |
| 114 | 102/122 only |
| 115 | 102/122 |
|  | 107/127 |
| 116 | none |
| 117 | 103/123 only |
| 118 | 105/125 only |
| 119 | 104/124 only |
| 120 | 105/125 only |

The overlapping areas are not necessarily known beforehand, nor are they always the same. A number of factors can make their sizes and shapes ebb and flow. The overlaps are therefore discovered heuristically, and abstractly treated later as virtual overlaps. Tables are maintained as to which service areas can overlap, e.g., as being currently reported by mobile user devices. If a service area of one base-station is not being sensed by mobile user devices in the service area of another base-station, then there are not any conflicts between them that need to be resolved by the central controller 108. In other words, if there are no problems, there need be no solutions issued.

As a corollary, a mobile user device not measuring a significant signal from more than one base-station does not need to report that fact unless it very recently reported an interference. Such could occur when the mobile user device moves out of an overlapping of service areas or the wireless channel changes. Any resources that were reserved because of that mobile user device could be immediately released.

Referring to Table I, if service area 127 represented a very busy area with lots of traffic, relative to its neighbors, then the central controller could instruct base-station 107 to keep all its otherwise conflicting resources active. Base-stations 101, 102, and 106 would be instructed to quiet all their respective channels that would otherwise interfere with base-station 107 in service area 127. As a consequence, the wholes of service areas 121, 122, and 126 would be depleted of those resources. And service area 127 would have its full resources available to deal with the heavy mobile user device traffic.

Communications latencies and database update latencies will prohibit central controller 108 from dealing with individual mobile user devices on a case-by-case basis. Service is demanded more quickly than the control decisions can be made. This is the included-fringe weaknesses in conventional networks and methods. Wholesale methods must be used. Here, resource pools are dealt by central controller 108 to the individual base-stations 101-107.

Near equal signal strength receptions reported by a mobile user device 110-120 indicate it is some fringe area overlapped by at least two base-station service areas. Signal strengths below some minimum predetermined level are not significant and therefore not reportable.

The mobile-user receiver signal strengths, and the identities of the mobile user device and the involved base-stations are reported through to the central controller 108. There, decisions are made as to which base-stations should back off or back down by vacating various frequency/time division slots. The central controller 108 has a global point-of-view, and thus can make top-level decisions that result in the best use of network resources system-wide. Resources are allocated so the heaviest traffic demands can nevertheless be serviced.

The wireless network 100, for example, uses OFDMA as its underlying physical layer (PHY) and operates according to IEEE-802.16e. The particular combinations of frequency bins and time slots used by the base-stations and mobile user devices is the principle network resource that can be allocated.

Figure 2:
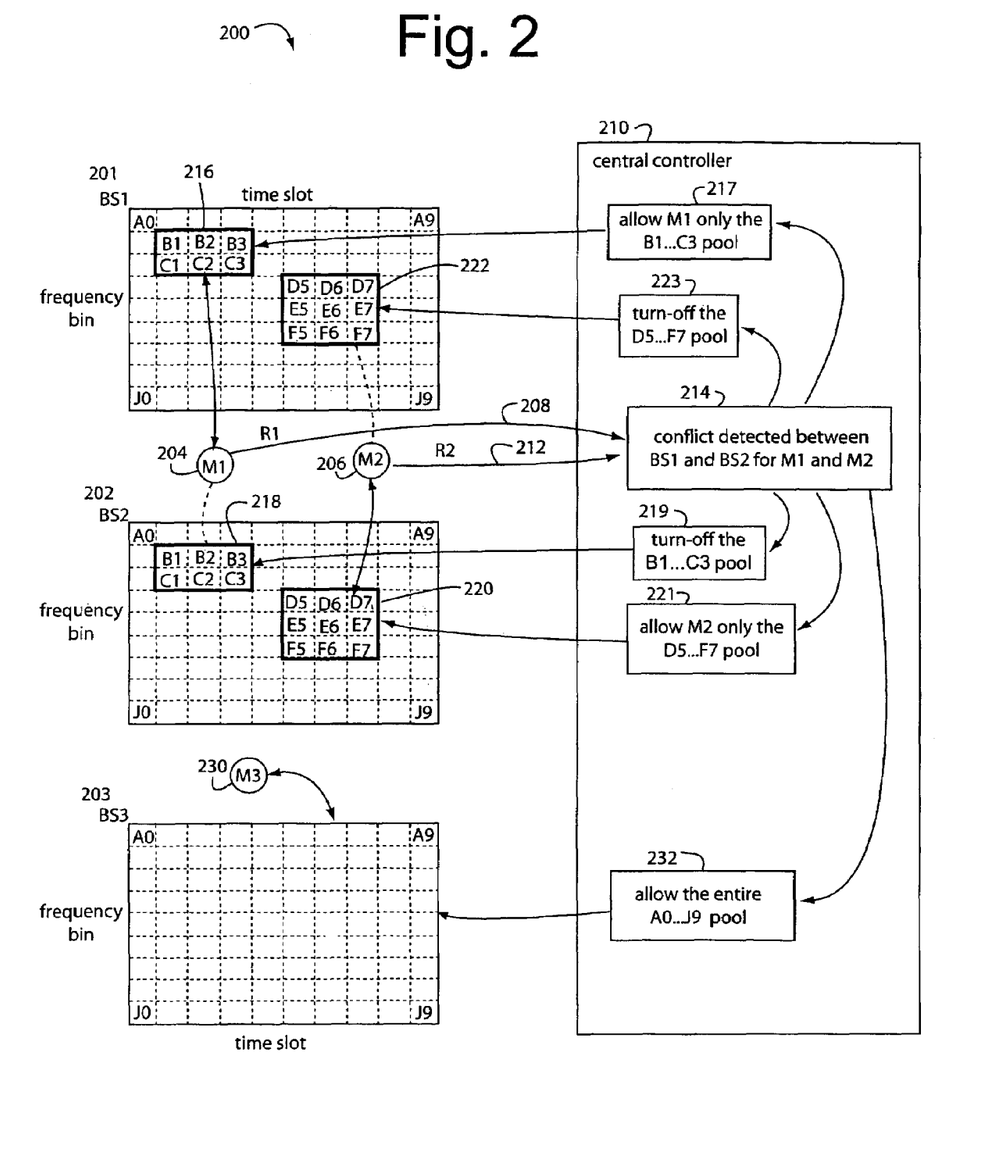
FIG. 2 is a block diagram showing the central controller's role in managing base-station resources.

FIG. 2 represents how these resources are shared in a method embodiment of the present invention, and is referred to herein by the general reference numeral 200. The combinations of frequency bin and time slot resources of three base-stations (BS1-BS3) 201-203 are all the same, e.g., frequency bins A . . . J and time slots 0 . . . 9. Mobile user devices (M1) 204 and (M2) 206 are placed between BS1 and BS2 to indicate a service area overlap or conflict. Both M1 204 and M2 206 could work with either of BS1 201 or BS2 202 because the signal strengths from each are good enough.

Embodiments of the present invention allocate special base-station resources to mobile user devices in the fringes that are also serviceable by a neighboring base-station. Such are referred to herein as an included-fringe mobile user device for a base-station that has been assigned to handle that particular mobile user device. If the central controller 108 has assigned another base-station to service it, then it is referred to herein as an excluded-fringe mobile user device. Mobile user devices that are not visible to other base-stations are simply referred to herein as mobile user devices. These mobile user devices can access the general base-station resources, but not any of the special base-station resources reserved for overlapping fringe area use. If no mobile user devices are operating in the overlapping fringe areas, then all the special base-station resources can be returned to the main pool of general base-station resources.

A report (R1) 208 is sent from M1 204 to a central controller 210 that includes measurements of the signal strengths M1 204 sees from BS1 201 and BS2 202. Similarly, a report (R2) 212 is sent from M2 206 to the central controller 210. Such report includes measurements of the signal strengths that M2 206 sees coming from BS1 201 and BS2 202. A conflict process 214 recognizes the mutual interference of BS1 and BS2 as seen from each of M1 and M2. It therefore decides to assign a reserved B1 . . . C3 resource pool 216 to handle M1 at BS1 by issuing a command 217. A B1 . . . C3 resource pool 218 at BS2 is either blanked off or de-powered by a command 219 to stop interference from BS2 at M1 with the B1 . . . C3 resource pool 216.

There is one pool assigned per base station for their included-fringe terminals, and there could be several pools that are blanked off in each base station for their excluded-fringe terminals. The decision to handle M2 206 differently could be for many reasons. It is possible that M2 206 could be assigned to work the same as M1 204 and use the reserved B1 . . . C3 resource pool 216. But for purposes of illustrating how method 200 can operate, it is assumed here that mobile user device M2 206 is assigned to work with a reserved D5 . . . F7 resource pool 220 at BS2 202 by a command 221. Balancing that, a matching D5 . . . F7 resource pool 222 at BS1 is blanked off or de-powered by a command 223.

Mobile user devices in the service area of BS3 203, e.g., M3 230, which see only one base-station and no conflicts or interference, have the entire A0 . . . J9 resource pool available. A command 232 issued to BS3 203 eliminates any blanked or de-powered resource pools because they are not needed. Otherwise, if some pools in a base-station have been blanked/de-powered, or reserved, as in BS1 201 and BS2 202, then mobile user devices without conflicts can be allowed to use any of the other general base-station resources.

Central controller 108 makes its resource reservation decisions based on interference reports and the traffic needs of the entire radio network, not just the adjacent sectors or base-stations. Conventional methods that use information from only the interfering cells or sectors to make resource reservation decision cannot reach an optimal solution.

The central controller 108 makes wholesale allocations of resource pools for the mobile user devices in the overlapping fringes, but a local scheduler included in each base-station is relied upon to do fair scheduling within the single service area. Such significantly optimizes the use of the spectrum resources and helps in providing Quality of Service (QoS) even in the overlapping fringe areas.

The central controller 108 manages the inclusive and exclusive fringe mobile user devices by pools, based on the traffic needs optimized over the entire network. The resource reservation should be adaptive and based on traffic patterns. Feasible scheduling requires local scheduler as well as global scheduler. The central controller 108 can allocate pool of resources for conflicting mobile user devices and local scheduler at the base-station can schedule according to traffic demand of mobile user devices. A pool of resources can be adaptive and changed by the central controller 108 periodically or when necessary. The granularity of global scheduling for conflicting mobile user devices allows real-time scheduling.

Referring again to FIG. 1, the wireless communications network 100 relies on central controller 108 to erect and teardown the pools of base-station resources according to reports it receives of duplicate base-station reception from roaming mobile user devices 110-120. The network of wireless base-stations 101-107 each have a respective service area 121-127 for supporting communications with the roaming mobile user devices. It can be seen that individual service areas may duplicate coverage in a plurality of overlapping fringe areas.

Referring now to FIG. 2, the inclusive-fringe base-station resource 216 for BS1 201, and inclusive-fringe base-station resource 220 for BS2 202, each reserve a pool of frequency bins and time slots. These allow unfettered communication with assigned roaming mobile user devices, e.g., M1 204 for BS1 201, and M2 for BS2 202. These operate within an adjacent overlapping fringe area, as learned in reports continually received by the central controller 210.

The exclusive-fringe base-station resources, e.g., 222 at BS1 201 and 218 at BS2 202, represent pools of frequency bins and time slots blanked/de-powered for communication with a non-assigned roaming mobile user devices. The exclusive-fringe base-station resources match a corresponding inclusive-fringe base-station resource at a neighboring one of the wireless base-stations.

A general base-station resource includes all the frequency bins and time slots not otherwise reserved to the inclusive-fringe or exclusive-fringe base-station resources. It provides for communication with all mobile user devices within an individual service area that are not within any of the overlapping fringe areas. The central controller 210 provides for commands 217, 219, 221, 217, and 232 to particular ones of wireless base-stations to erect or teardown corresponding inclusive-fringe and exclusive-fringe base-station resources. This after an analysis of all the reports it receives from the mobile user devices for the whole of the wireless communications network.

Central controller 108 can construct tables to help analyze and deal with the data it collects from overlapping fringe areas reported by the roaming mobile user devices. For example, four tables, as in Tables II to V, can be constructed. These, of course, are only small easy-to-understand examples. Real world applications could involve thousands of roaming mobile user devices.

TABLE II

| Central Controller Raw Report Data | | | | | | | |
|---|---|---|---|---|---|---|---|
| | BS1 | BS2 | BS3 | BS4 | BS5 | BS6 | BS7 |
| M1 | 1 | 0 | 0 | 0 | 0 | 0 | 0 |
| M2 | 1 | 0 | 0 | 0 | 0 | 0 | 1 |
| M3 | 1 | 1 | 0 | 0 | 0 | 0 | 1 |
| M4 | 0 | 0 | 0 | 0 | 0 | 1 | 0 |
| M5 | 0 | 0 | 0 | 0 | 1 | 1 | 1 |
| M6 | 0 | 0 | 0 | 0 | 1 | 0 | 1 |
| M7 | 0 | 0 | 0 | 1 | 1 | 0 | 1 |

Table-II represents the heuristic report data from a representative sample of mobile users M1-M7 being serviced by a small network of base-stations BS1-BS7 tied together by a central controller. Mobile user device M1 is only receiving base-station BS1. But M2 is receiving both BS1 and BS7, resulting in adjacent-cell interference. M3 is receiving three base stations, BS1, BS2, and BS7. Again resulting in adjacent-cell interference, and arguably more severe as far as M3 is concerned. M4 is only receiving BS6, so there is no conflict. M5 is receiving three base-stations, BS5, BS6, and BS7. M6 is receiving two, BS5 and BS7. And M7 is receiving three, BS4, BS5, and BS7.

TABLE III

| No Interference | | | | | | | |
|---|---|---|---|---|---|---|---|
| NI | BS1 | BS2 | BS3 | BS4 | BS5 | BS6 | BS7 |
| M1 | 1 | 0 | 0 | 0 | 0 | 0 | 0 |
| M2 | 0 | 0 | 0 | 0 | 0 | 0 | 0 |
| M3 | 0 | 0 | 0 | 0 | 0 | 0 | 0 |
| M4 | 0 | 0 | 0 | 0 | 0 | 1 | 0 |
| M5 | 0 | 0 | 0 | 0 | 0 | 0 | 0 |
| M6 | 0 | 0 | 0 | 0 | 0 | 0 | 0 |
| M7 | 0 | 0 | 0 | 0 | 0 | 0 | 0 |

Table-III can be derived from Interference Table-II. M1 has no interference receiving BS1. M4 has no interference receiving BS6. Therefore, M1 at BS1 and M4 at BS6 will be assigned to general base-station resources.

TABLE IV

| Inclusive-Fringe | | | | | | | |
|---|---|---|---|---|---|---|---|
| inclusive | BS1 | BS2 | BS3 | BS4 | BS5 | BS6 | BS7 |
| M1 | 0 | 0 | 0 | 0 | 0 | 0 | 0 |
| M2 | 1 | 0 | 0 | 0 | 0 | 0 | 0 |
| M3 | 0 | 1 | 0 | 0 | 0 | 0 | 0 |
| M4 | 0 | 0 | 0 | 0 | 0 | 0 | 0 |
| M5 | 0 | 0 | 0 | 0 | 0 | 0 | 1 |
| M6 | 0 | 0 | 0 | 0 | 1 | 0 | 0 |
| M7 | 0 | 0 | 0 | 1 | 0 | 0 | 0 |

Table-IV can be derived from Interference Table-II. This resource is needed by those mobile user devices receiving more than one base-station. The central controller decides which base-station will service a mobile user device when an interference between two or more base-stations exists. M2 has been assigned to inclusive-fringe base-station resources for BS1. M3 has been assigned to inclusive-fringe base-station resources for BS2. M5 has been assigned to inclusive-fringe base-station resources for BS7. M6 has been assigned to inclusive-fringe base-station resources for BS5. And, M7 has been assigned to inclusive-fringe base-station resources for BS4.

TABLE V

| Exclusive-Fringe | | | | | | | |
|---|---|---|---|---|---|---|---|
| exclusive | BS1 | BS2 | BS3 | BS4 | BS5 | BS6 | BS7 |
| M1 | 0 | 0 | 0 | 0 | 0 | 0 | 0 |
| M2 | 0 | 0 | 0 | 0 | 0 | 0 | 1 |
| M3 | 1 | 0 | 0 | 0 | 0 | 0 | 1 |
| M4 | 0 | 0 | 0 | 0 | 0 | 0 | 0 |
| M5 | 0 | 0 | 0 | 0 | 1 | 1 | 0 |
| M6 | 0 | 0 | 0 | 0 | 0 | 0 | 1 |
| M7 | 0 | 0 | 0 | 0 | 1 | 0 | 1 |

Table-V can be derived from Interference Table-II. This resource eliminates conflicts seen by mobile user devices receiving more than one base-station. The central controller decides which base-stations should not service a mobile user device when an interference between two or more base-stations exists. M2 has been assigned to exclusive-fringe base-station resources for BS7, so as to allow BS1 to handle the M2 traffic. M3 has been assigned to exclusive-fringe base-station resources for BS1. M5 has been assigned to exclusive-fringe base-station resources for BS5 and BS6, e.g., to allow BS7 to handle the traffic. M6 has been assigned to inclusive-fringe base-station resources for BS7, e.g., to allow BS5 to handle the traffic. And, M7 has been assigned to exclusive-fringe base-station resources for BS5 and BS7.

The central controller determines the pools. The base-station use their pools to resolve local conflicts. The central controller does not assign a resource directly, e.g., to M1, but leaves that decision up to the responsible base-station.

A method embodiment of the present invention allows a central controller estimate the relative geographic locations of base-stations and mobile user devices in a wireless communication network. The method comprises: (1) connecting a central controller to a wireless network that includes base-stations and service areas for a population of remote, subscriber terminal, and roaming mobile user devices; (2) gathering heuristic measurements to estimate the ranging distance of each mobile user device to each base-station that can communicate with it; (3) forwarding logs of said distance measurements to said central controller for triangulation calculations; (4) making initial estimates of the relative locations of the base-stations using the distances determined between mobile user devices and base-station pairs; (5) refining more exact estimates of the relative locations of the base-stations with additional distance estimates obtained for the mobile user devices as individuals independently roam in the service areas; and, (6) storing tracking information for the changing positions of mobile user devices in a database.

Another method embodiment of the present invention uses network wide interference knowledge to guide the base stations to electronically steer antennas such that respective service areas do not overlap. This allows for more effective reuse of the radio spectrum.

A further method embodiment of the present invention provides for spatial-scheduling of wireless broadband air resources using electronically steerable antennas at the base-stations. Resources for mobile user devices are allocated so that the respective service areas do not overlap. A resource in one direction which is not used because of a secondary node can be used to service a mobile user device in opposite direction.

Figure 3:
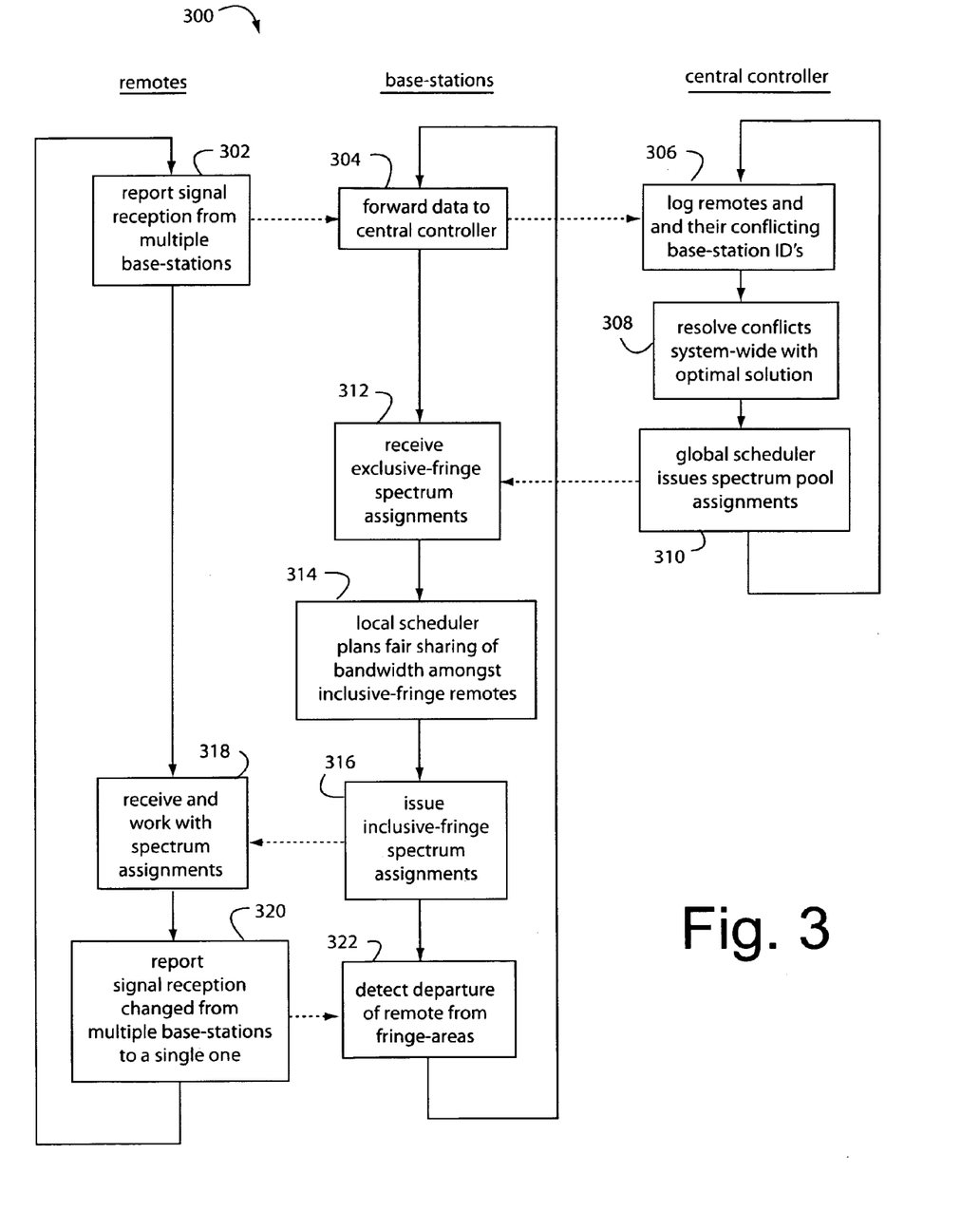
FIG. 3 is a flowchart diagram of a method embodiment of the present invention showing each of a remote, base-station, and central controller together with their interactions during operation in a cellular wireless network.

In FIG. 3, a split-scheduler method embodiment of the present invention, is referred to herein by the general reference numeral 300. The method 300 operates interactively across remotes, base-stations, and the central controller, as in FIGS. 1 and 2. Each remote uses a process 302 to report if it sees conflicts in overlapping transmissions from two or more base-stations. In other words, if the remote is in a fringe area. One of the base-stations receives the report in a process 304 and forwards it to a process 306 in the central controller.

Process 306 logs in all the remotes seeing conflicts and all the base-stations that are causing the conflicts. A network-wide conflict analysis process 308 at the central controller analyzes the network wide traffic needs and the interference patterns. A global scheduler 310 allocates adaptive pools of resources for the fringe zones. A process 312 receives the spectrum assignments. A local scheduler process 314 at the base-stations ensure that available bandwidth will be shared fairly by the base stations for the terminals in the inclusive-fringe. The scheduling mechanism can use time and/or frequency. Each communication channel is divided into sub-channels with sub-carriers. Time is divided into slots, and a set of slots constitutes a frame. A downlink transmission communicates data from a base-station to the terminal devices in the service area. An uplink transmission communicates data from the terminal devices up to a base-station in their area.

A process 316 issues the inclusive-fringe spectrum work assignments. A process 318 at the remotes receives the inclusive-fringe assignments and works them for their communications tasks. A process 320 reports changes, like the disappearance of base-station conflicts. A step 322 detects remotes that no longer need to participate in the global scheduling.

Subchannel and slot allocations for mobile user devices in the interference zones is coordinated by the central controller. Downlink packets are intercepted by the central controller which informs the included-fringe base-station of the mobile user device as well as the secondary base-stations that are heard by the mobile user device. The central controller assigns non-overlapping pools to the base-stations. From those pools, the base-stations assign resources to particular subscriber terminals in the fringe areas. In one example, if central controller assigns sub-channels (1,2,4), and slots (A,B,C), to a particular mobile user device, then these resources cannot also be assigned for other base-stations that are heard by the same mobile user device.

In the uplink, if a mobile user device initiates a data transmission, neighboring base-stations listen and will not assign the same resources that are already assigned to that mobile user device.

Mobile user devices can measure the interference levels of base-stations. Interference levels may be a measure of the signal-to-noise ratio (SNR), received signal strength indicator (RSSI), or ranging. Each mobile user device sends report information to the central controller which constructs an interference matrix (I).

Resource allocation is generic since it accommodates a variety of topologies and interference readings. Resource allocation in the central controller generates non-overlapping resources, e.g., pools. Central controller assigns a resource to non-conflicting mobile user devices of each radio resource. Local scheduler can share among non-conflicting mobile user devices. Central controller also assigns different pools for the included-fringe mobile user devices. The local scheduler fairly shares the resources among the competing mobile user devices in the region. The scheduler assigns the rest of the resources such that, a base-station can not use a resource for its non-conflicting and included-fringe mobile user devices if it is used by its excluded-fringe mobile user devices.

A general rule for resource allocation allows the scheduling function to create resources for conflicting mobile user devices according to an interference matrix. The maximum resources it can create is "R", the number of base-stations. The minimum resources it can create is "C", a maximum of "SC". So, "C" is equal to the maximum number of base-stations a mobile user device sees interfering.

Initially, a base-station can be assigned a resource from one to "C" on the condition that no two base stations bordering to each other has the same resource. There are available additional resources between "C" to "R", if necessary. If a resource allocation is completed using only "C" resources, then an optimum is achieved. Each base-station has a resource vector "RV", which has "R" indices.

The resource allocation mechanism tries to allocate using "K" resources initially, and is set to "C". The number of resources is incremented if necessary. The upper bound is "R", and the lower bound is "C".

| Resource Allocation Rules |
|---|
| Rule 0: Row by row I is processed. Starting from first row channel assignment is pursued. |
| Rule 1: Minimum number is chosen from the first "K" indices of RV and that resource is assigned to a base-station. |

-continued

Resource Allocation Rules

Rule 2: If a resource is allocated to a base-station. Then that resource is blocked out from the resource vectors of base-stations which have a common conflicting node with the base-station. Common conflicting node information can be found from I matrix. The remaining indices of the resource vector of the base-station are blocked out.
Rule 3: In the block out process. The indices of the RV is replaced with a higher number which is bigger than "R".
Rule 4: After each block out process. Resource vectors are monitored and if there is only one resource left from the first "K" indices of RV. That resource is allocated to that base-station right away. After this, Rule 2 is applied.
Rule 5: In their row by row processing, when allocating a resource to a base-station, the other base-stations which have the common conflicting mobile user devices are first checked. If they were assigned resources already, that resources are taken into consideration when allocating the resource for this base-station.
Rule 6: When if first "K" resources are blocked out for a base-station and its channel is not assigned then, "K" is incremented by 1 and "K" + 1 is assigned to base-station. Then Rule 1, 2, 3, 4, and 5 is applied in the same way.

An allocated resource can change or its placement can be varied by the central controller. Each resource can be re-assigned a new spectrum combination according to a traffic demand of mobile user devices assigned to a resource region. Each resource can also vary in capacity, but should be consistent amongst base-stations. Within a resource region, a local scheduler at a base-station employs fair scheduling for QoS. The central controller inspects the data traffic and determines the ON/OFF state of mobile user devices to updates the I matrix. The central controller inspects the conflicting and non-conflicting mobile user devices, and determines an optimum resource that can be erected. These can be periodically re-adapted to fit better. Central controller should also balance the traffic for maximum channel re-use. The base-station selected to serve a mobile user device can be traded around to create an optimum topology.

After resource allocation is complete for each base-station, the central controller inspects the resource allocations for the excluded-fringe mobile user devices. If a base-station does not have an excluded-fringe mobile user device for a particular resource, the base-station can use that resource for its non-conflicting mobile user devices.

Once a resource is granted to a connection, shuffling can enhances the quality of the connection through channel diversity. Packet transmissions in a connection are reshuffled both in frequency and in time to combat narrowband noise and fading. Each base-station applies the same policy consequently resources move in the same way in all base-stations.

Assuming a mobile user device at a point A has a distance estimate (d) to a first base-station, and distance estimate (m) to a second base-station. A mirror-point B can be found that also satisfies the same distance estimates. This situation occurs when there are only two estimates. If there is only one estimate, no interference problem arises.

A mobile user device at point A produces distance <d,m>, RSSI, and SNR estimates. This information is sent to the central controller to identify mobile user device position through a lookup table. If a mobile user device position matches coordinates of (10,12) and (7,9) with respect to distance estimates, then central controller can prune the estimate to (10,12).

Several methods can be used to find the base-station locations. For example, manually during installation, surveyed by GPS, it can be done with a dedicated apparatus, or it can be done with the knowledge of distance values. Knowing the location of the base-stations allows the mobile user device location to be found by triangulation. As a result, central controller can locate mobile user device and gather interference level data. If a mobile user device hears more than one base-station, then the location of the mobile user device is mapped as a interference zone.

When an electronically steerable antenna is available, nearly complete frequency reuse can be realized by electronically directing spectrum resources to be non-overlapping. All resources are utilized, because they are dealt out with respect to geographical locations of mobile user devices.

A resource allocation method of the present invention is dynamic and differs from conventional fixed cellular planning. The same resources can be used globally, and different resources only need to be allocated to over-lapping regions. Resources can be seized if there are no conflicting mobile user devices in the area. The resource region and size allocated for conflicting mobile user device adapt to traffic demands. Depending on the traffic demand, central controller 108 can adjust the capacity of each resource, or create/cancel particular resources. If interference fringes become enlarged, more resources can be created to deal with the increases.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A wireless communications network, comprising:
    a central controller providing for management of pools of base-station resources according to reports of duplicate base-station reception received from a plurality of remote devices;
    a plurality of wireless base-stations each having a respective service area for supporting communications with said remote devices, and such that individual service areas may duplicate coverage in a plurality of overlapping fringe areas;
    an inclusive-fringe base-station resource at each of the plurality of wireless base-stations that reserves a pool of frequency bins and time slots for communication with an assigned remote device operating within an adjacent particular one of said overlapping fringe areas according to a report received by the central controller;
    an exclusive-fringe base-station resource at each of the plurality of wireless base-stations that blanks/de-powers a pool of frequency bins and time slots for communication with a non-assigned remote device operating within a adjacent particular one of said overlapping fringe areas according to a report received by the central controller, and that matches a corresponding inclusive-fringe base-station resource at a neighboring one of the plurality of wireless base-stations; and
    a general base-station resource that includes all the frequency bins and time slots not otherwise reserved to the inclusive-fringe or exclusive-fringe base-station resources, and providing for communication with all mobile user devices within an individual service area that are further not within any of said plurality of overlapping fringe areas;

wherein, the central controller provides for commands to particular ones of the plurality of wireless base-stations to erect or teardown corresponding inclusive-fringe and exclusive-fringe base-station resources according to an analysis of all the reports it receives from the mobile user devices for the whole of the wireless communications network.

2. The wireless communications network of claim 1, further comprising:

a plurality of mobile user devices providing for generating said reports of duplicate base-station reception when operating in said overlapping fringe areas;

wherein, said reports identify the particular base-stations and mobile user devices involved.

3. The wireless communications network of claim 1, further comprising:

a split-scheduler which includes a global scheduler located at the central controller and a plurality of local schedulers each associated with a base-stations, and such that said global scheduler analyzes a network-wide traffic need and interference pattern, to allocate adaptive pools of resources for fringe zones.

4. The wireless communications network of claim 3, wherein:

said local schedulers at each base-station fairly share bandwidth amongst remote devices in an inclusive-fringe.

5. A method for operating a cellular radio system, comprising:

using remote devices to report to a central controller they are receiving significant signals from more than one adjacent wireless base-station;

assigning a first group of said remote devices to be handled by a first pool of resources by a first adjacent wireless base-station;

appointing a second group of said remote devices to be handled by a second pool of resources by a second adjacent wireless base-station;

disabling said second pool of resources at said first adjacent wireless base-station to eliminate interference to said second group of remote devices; and halting said first pool of resources at said second adjacent wireless base-station to eliminate interference to said first group of remote devices.

6. A method for operating a cellular radio system, comprising:

scanning available base-stations for interference zone information between base-stations and between mobiles;

introducing a split-scheduler architecture with centralized radio access network-wide knowledge, allocating sub-carriers, time slots, and other spectrum resources in real-time based on location, interference and bandwidth demand of mobiles, directivity scheduling time and frequency for near unity frequency re-use; and adapting resource reservation according to mobiles' traffic demands; and resource grabbing for using channel resources reserved for secondary mobiles tied to other base-stations.

7. A method for operating a radio system, comprising:

logging position information for a plurality of mobiles and plurality of base-stations servicing them in a wireless network;

determining, at the central controller, position of a mobile via plurality of communication wirelessly between the base-stations and a mobile and between the base-station and the central controller;

applying access network-wide real-time interference-knowledge at said central controller to guide electronic steering of antennas by all base stations in a coordinated way to use resources located in directions not otherwise used by neighboring base-stations.

8. The method of claim 7, wherein the central controller makes wholesale allocations of resource pools for mobile user devices in overlapping fringes, and a local scheduler included in each base-station is relied upon to do fair scheduling within the single service area.

9. The method of claim 7, further comprising:

using a split-scheduler that includes a global scheduler located at said central controller and a plurality of local schedulers each associated with a base-stations, such that said global scheduler analyzes a network-wide traffic need and interference pattern, and allocates adaptive pools of resources for fringe zones, and said local schedulers at each base-station fairly share bandwidth amongst remote devices operating in an inclusive-fringe.

* * * * *